United States Patent
Thacker

(10) Patent No.: US 7,571,265 B2
(45) Date of Patent: Aug. 4, 2009

(54) DETERRING THEFT AND UNAUTHORIZED USE OF ELECTRONIC DEVICES THROUGH THE USE OF COUNTERS AND PRIVATE CODE

(75) Inventor: Charles P. Thacker, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 10/918,364

(22) Filed: Aug. 16, 2004

(65) Prior Publication Data

US 2006/0036781 A1     Feb. 16, 2006

(51) Int. Cl.
G06F 3/00 (2006.01)
G06F 13/12 (2006.01)
G06F 13/38 (2006.01)
H04M 1/66 (2006.01)
H04M 1/68 (2006.01)
H04M 3/16 (2006.01)

(52) U.S. Cl. ............... 710/36; 710/8; 710/10; 710/15; 710/19; 710/37; 710/62; 455/410; 455/411

(58) Field of Classification Search .............. 710/8, 710/10, 19, 36; 340/5.26
See application file for complete search history.

(56) References Cited

U.S. PATENT DOCUMENTS

| | | | | |
|---|---|---|---|---|
| 3,757,131 A * | 9/1973 | Krutz et al. | | 307/64 |
| 4,353,064 A * | 10/1982 | Stamm | | 340/5.61 |
| 4,779,090 A * | 10/1988 | Micznik et al. | | 340/5.26 |
| 4,926,481 A * | 5/1990 | Collins, Jr. | | 713/184 |
| 5,118,648 A * | 6/1992 | Furtek et al. | | 502/116 |
| 5,530,431 A * | 6/1996 | Wingard | | 340/310.11 |
| 6,487,610 B2 * | 11/2002 | Schaefer | | 710/8 |
| 6,536,536 B1 * | 3/2003 | Gass et al. | | 173/2 |
| 6,756,704 B2 * | 6/2004 | Milojicic et al. | | 307/149 |
| 6,769,036 B1 * | 7/2004 | Cortopassi et al. | | 710/15 |
| 6,879,810 B2 * | 4/2005 | Bouet | | 455/41.2 |
| 7,225,280 B2 * | 5/2007 | Moran | | 710/74 |

(Continued)

OTHER PUBLICATIONS

Patrick Droz et al. "Wanted: A Theft-Deterrent Solution for the Pervasive Computing World," Computer Communications and Networks, 2000. Proceedings. Ninth Internal Conference on (Oct. 16-18, 2000). pp. 374-379.*

(Continued)

Primary Examiner—Tammara Peyton
Assistant Examiner—Henry Yu
(74) Attorney, Agent, or Firm—Birch, Stewart, Kolasch & Birch, LLP

(57) ABSTRACT

A system and method are provided for reducing a potential thief's motivation to steal an electronic device, by rendering the device inoperative at some time after it is stolen. The mechanism used to deter theft may include a modified primary integrated circuit chip in the electronic device, such as the central processing unit (CPU), a memory controller chip, or a primary input/output (I/O) chip. The chip may be important enough to the normal operation of the electronic device such that without normal operation of the chip, the electronic device also would not operate normally, thus rendering the electronic device partially or fully disabled. A "recharger" device may be used to recharge, or reset the operability of the chip.

18 Claims, 8 Drawing Sheets

U.S. PATENT DOCUMENTS

| | | | |
|---|---|---|---|
| 2003/0061503 A1* | 3/2003 | Katz et al. | 713/200 |
| 2003/0163716 A1* | 8/2003 | Robins et al. | 713/193 |
| 2004/0181675 A1* | 9/2004 | Hansen | 713/182 |
| 2005/0060233 A1* | 3/2005 | Bonalle et al. | 705/16 |
| 2005/0251868 A1* | 11/2005 | James | 726/35 |
| 2006/0148449 A1* | 7/2006 | Budde et al. | 455/410 |

OTHER PUBLICATIONS

"Specification of the Bluetooth System," Version 1.2 (Nov. 5, 2003).*

"Bluetooth Security White Paper." Revision 1.0. Bluetooth SIG Security Expert Group (Apr. 19, 2002).*

"Synchronization Profile." Bluetooth Specification Version 1.1 (Feb. 22, 2001).*

* cited by examiner

DETERRING THEFT AND UNAUTHORIZED USE OF ELECTRONIC DEVICES THROUGH THE USE OF COUNTERS AND PRIVATE CODE

FIELD OF THE INVENTION

Aspects of the present invention are directed generally to securing electronic devices, and more particularly to preventing electronic devices from operating normally in the event that they are stolen or lost.

BACKGROUND OF THE INVENTION

As electronic devices become more portable and valuable, theft of such electronic devices has simultaneously become problematic. Currently there are limited options for deterring theft of electronic devices. Physical locks, similar to bicycle locks, exist for laptop computers. However, the physical locks are burdensome to use, which may explain why so many people have such physical locks but do not actually use them on a regular basis. In addition, these physical locks can easily be cut, and in any event the locks only work if there is something secure to connect the physical lock to.

Another existing security option is password protection. Personal digital assistants (PDAs) and laptops typically use such protection. However, given sufficient time and the right software, a thief may eventually break through such protection. For example, the thief may simply reload the operating system to bypass and/or redefine the user-ID and password.

Regardless of the security precautions taken, there is currently no satisfactory way to rent an electronic device and to control how long the renting user may operate the device. Even with password protection, the user may decide not to return the device.

SUMMARY OF THE INVENTION

Aspects of the present invention are therefore directed to reducing the motivation of a potential thief to steal an electronic device, such as a portable computing device, by rendering the device inoperative at some time after they are stolen. The mechanism used to deter theft may include a modified primary integrated circuit chip in the electronic device, such as the central processing unit (CPU), a memory controller chip, or a primary input/output (I/O) chip. Preferably, the chip is important enough to the normal operation of the electronic device such that without normal operation of the chip, the electronic device also would not operate normally, thus rendering the electronic device partially or fully disabled. Although in theory the chip on a stolen disabled electronic device could be replaced to make the electronic device operable again, chip replacement is a difficult and time-consuming process. Moreover, the replacement chip itself may be expensive to obtain, especially if the chip is the central processing chip or the like. Therefore, re-enabling an electronic device without authorization would not only be difficult, but it likely would be unprofitable as well.

Further aspects of the present invention are directed to using a persistent counter on the integrated circuit chip to count down (or up) to a predetermined value. Once the predetermined value has been reached, the integrated circuit is disabled, thereby also disabling the electronic device. The counter may count up or down responsive to an on-chip oscillator. The oscillator need not be very precise (e.g., +/−5%), since it needs only to provide an approximate time standard. Preferably, the oscillator is not accessible from outside the integrated circuit chip.

Still further aspects of the present invention are directed to a "recharger," which is a device that, when properly coupled with the electronic device, causes the counter to be reset, thereby "recharging" the usability of the electronic device.

Still further aspects of the present invention are directed to "bonding" the recharger with the electronic device. This authorizes a particular recharger to be able to recharge a particular electronic device. Each electronic device may have its own bonded recharger.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

An Illustrative Electronic Device

Figure 1:
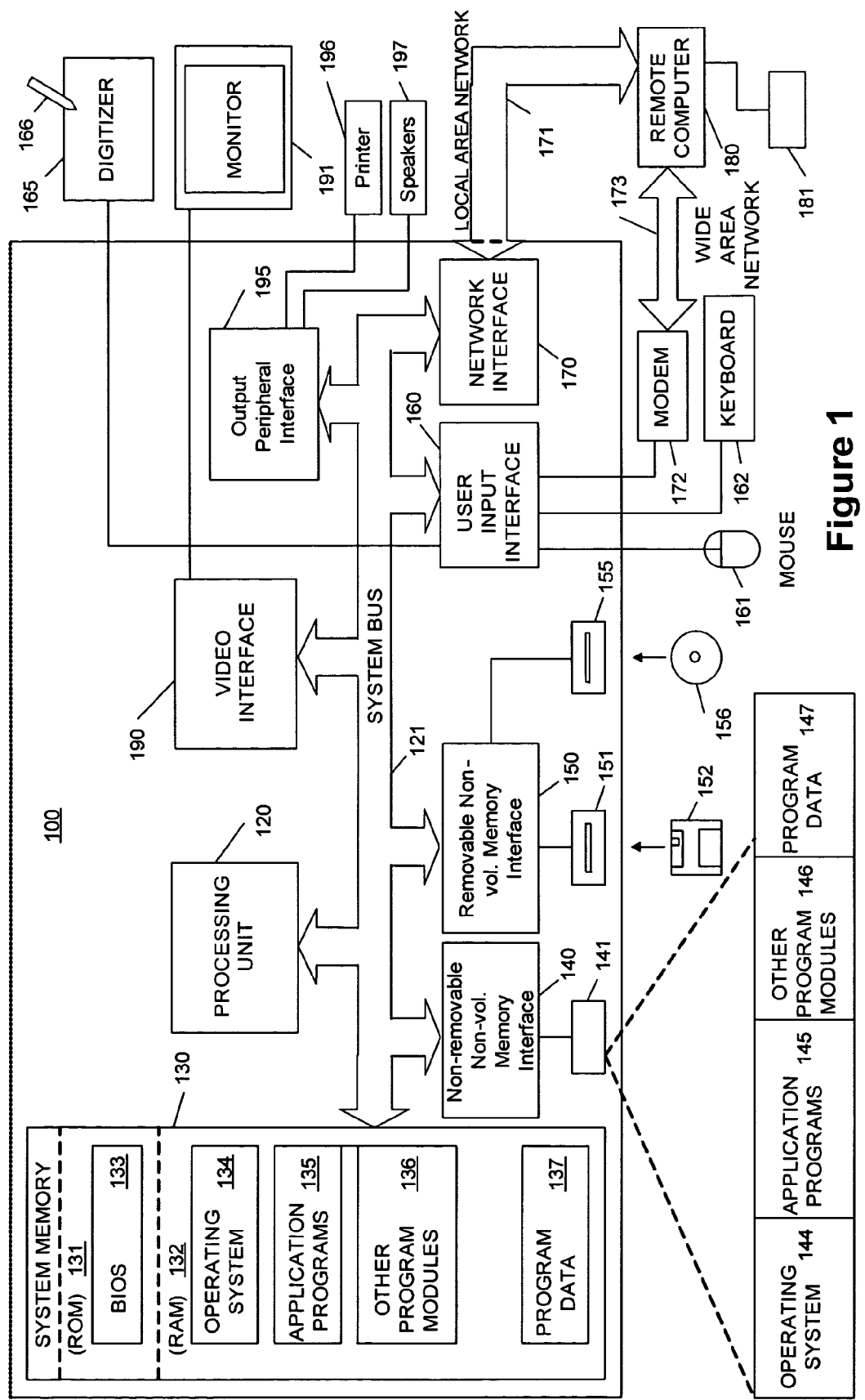
FIG. 1 is a functional block diagram of an illustrative electronic device in accordance with at least one aspect of the present invention.

Aspects of the present invention may be used in connection with an electronic device that may be rendered disabled in appropriate circumstances. The electronic device may be any portable or non-portable electronic device such as, but not limited to, a mobile telephone, a personal digital assistant (PDA), a portable computer such as a laptop computer or a tablet personal computer, a desktop computer, a projector, a monitor, a television set, a digital watch, audio equipment such as a digital video disc (DVD) player, or a printer. For example, FIG. 1 shows an illustrative electronic device, which in this example is a computer 100. Components of the computer 100 may include, but are not limited to, a processing unit 120, a system memory 130, and a system bus 121 that couples various system components including the system memory 130 to the processing unit 120. The system bus 121 may include any of several types of bus structures including a memory bus or memory controller, a peripheral bus, and/or a local bus using any of a variety of bus architectures.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in the ROM 131. The RAM 132 typically contains data and/or program modules that are immediately accessible to and/or presently being operated on by processing unit 120. The computer 100 may also store and/or execute an operating system 134, one or more application programs 135, other program modules 136, and/or program data 137. The computer 100 may further include other removable/non-removable, volatile/nonvolatile computer storage media. By way of example only, FIG. 1 illustrates a hard disk drive 141 that reads from and/or writes to non-removable, nonvolatile magnetic media, a magnetic disk drive 151 that reads from and/or writes to a removable nonvolatile magnetic disk 152, and an optical disk drive 155 that reads from and/or writes to a removable, nonvolatile optical disk 156 such as a CD ROM or other optical media. Other removable/non-removable and volatile/nonvolatile computer storage media that may be used include, e.g., magnetic tape cassettes, flash memory cards, digital versatile disks, digital video tape, solid state RAM, solid state ROM, and the like. The hard disk drive 141 is typically connected to the system bus 121 through a non-removable memory interface such as non-removable nonvolatile memory interface 140, and magnetic disk drive 151 and optical disk drive 155 are typically connected to the system bus 121 by a removable memory interface, such as removable nonvolatile interface 150.

A user may enter commands and information into the computer 100 through input devices such as a keyboard 162 and/or a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be coupled via other interface and bus structures such as a parallel port, a game port, or a universal serial bus (USB). A monitor 191 or other type of display device is also connected to the system bus 121 via an interface such as a video interface 190. The computer 100 may further include other peripheral output devices such as speakers 197 and printer 196, which may be connected to the system bus 121 via an output peripheral interface 195.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 120 directly, via parallel port or another interface, or via the system bus 121 by any technique, either wired or wirelessly. The pen 166 may further have other sensing systems for determining strokes of electronic ink including, e.g., accelerometers and magnetometers.

The computer 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. The computer 100 may further include wired and/or wireless capabilities. For example, the network interface 170 may be Bluetooth, SWLan, and/or IEEE 802.11 compatible. It is appreciated that other wireless communication protocols may be used in conjunction with these protocols or in place of these protocols.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160 or other appropriate mechanism.

Typically, one or more of the components of the computer 100, such as the processing unit 120, the system memory 130, and the input/output units such as the user input interface 160, the network interface 170, the output peripheral interface 195, and the video interface 190, may include one or more integrated circuits. As will be discussed further, one or more of these integrated circuits may include disabling circuitry in the integrated circuit itself that may cause the integrated circuit to become disabled under appropriate circumstances.

Illustrative Recharger/Electronic Device Pairs

Figure 2:
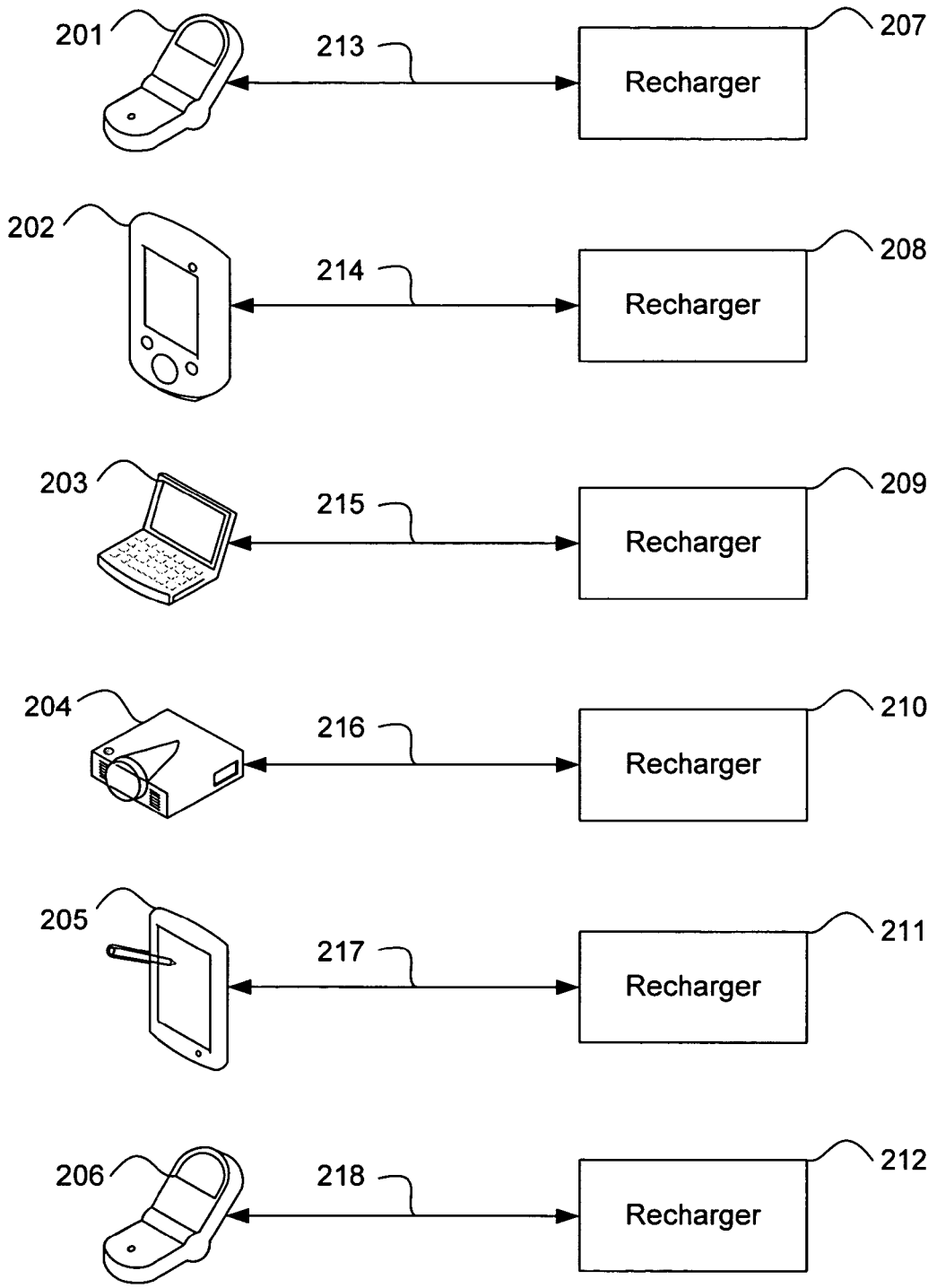
FIG. 2 shows a variety of illustrative electronic devices being used in accordance with at least one aspect of the present invention.

FIG. 2 illustrates various types of electronic devices that may be used such as, but not limited to, mobile telephones 201 and 206, a personal digital assistant (PDA) 202, a portable computer 203, a projector 204, and a tablet personal computer 205. Each of these electronic devices 201-206 may be configured as in FIG. 1 or in any other manner. Each of these electronic devices 201-206 may be associated with a respective "recharger" 207-212. As will be discussed later, each recharger 207-212 may be "bonded" with its associated respective electronic device 201-206. For example, the recharger 207 may be bonded with the mobile telephone 201, and the recharger 208 may be bonded with the PDA 202. Once bonded with an electronic device, a recharger (e.g., recharger 207) may be configured to restrict bonding with any other electronic device. For example, once bonded to the mobile telephone 201, recharger 207 may be configured to only be usable with the mobile telephone 201. Each recharger 207-212 may be sold or otherwise provided to the end user in an "unbonded" state. In other words, a recharger may be provided to the end user wherein the recharger has not yet been bonded to any electronic device. The end user then bonds the recharger to the electronic device (see discussion regarding bonding below). Alternatively, a recharger may already be pre-bonded to a particular electronic device before being provided to the end user. In addition, an electronic device and its associated recharger (whether pre-bonded or not) may be marketed together as a kit.

Data communication paths 213-218 may provide for communication between one of the electronic devices 201-206 and its associated recharger 207-212. Such communication may be provided in any way that supports data communication (e.g., electrical, optical, electromagnetic). The data communications paths 213-218 may be wired and/or wireless.

Each of the rechargers 207-212 may be a dedicated-function device and/or may be embedded in or otherwise combined with another device. For example, the recharger 207 may be part of a conventional electrical power charger that is used to provide electrical power to the mobile telephone 201. As used herein, to "recharge" an electronic device is to instruct or request the electronic device to extend the amount of remaining time that the electronic device will operate normally. If the remaining time runs out, the electronic device becomes inoperable or at a minimum does not operate normally. As will be discussed below, the electronic device itself (e.g., the mobile telephone 201) may monitor itself and determine whether it should operate normally or not, depending upon when the electronic device was last recharged.

Where the recharger 207 is combined with a power charger, the mobile telephone 201 would be "recharged" whenever the user plugs the power charger into the mobile telephone 201. This may be advantageous and convenient for the user because the combination recharger/power charger presents no greater burden to the user than a conventional power charger. In another illustrative embodiment, a recharger such as the recharger 207 may be a small handheld device that may, for example, be attached to a keychain. In such an embodiment, the user may plug the recharger 207 into a dedicated recharging port on the mobile telephone 201 as needed or desired.

An Illustrative Integrated Circuit with Disabling Circuitry

Figure 3:
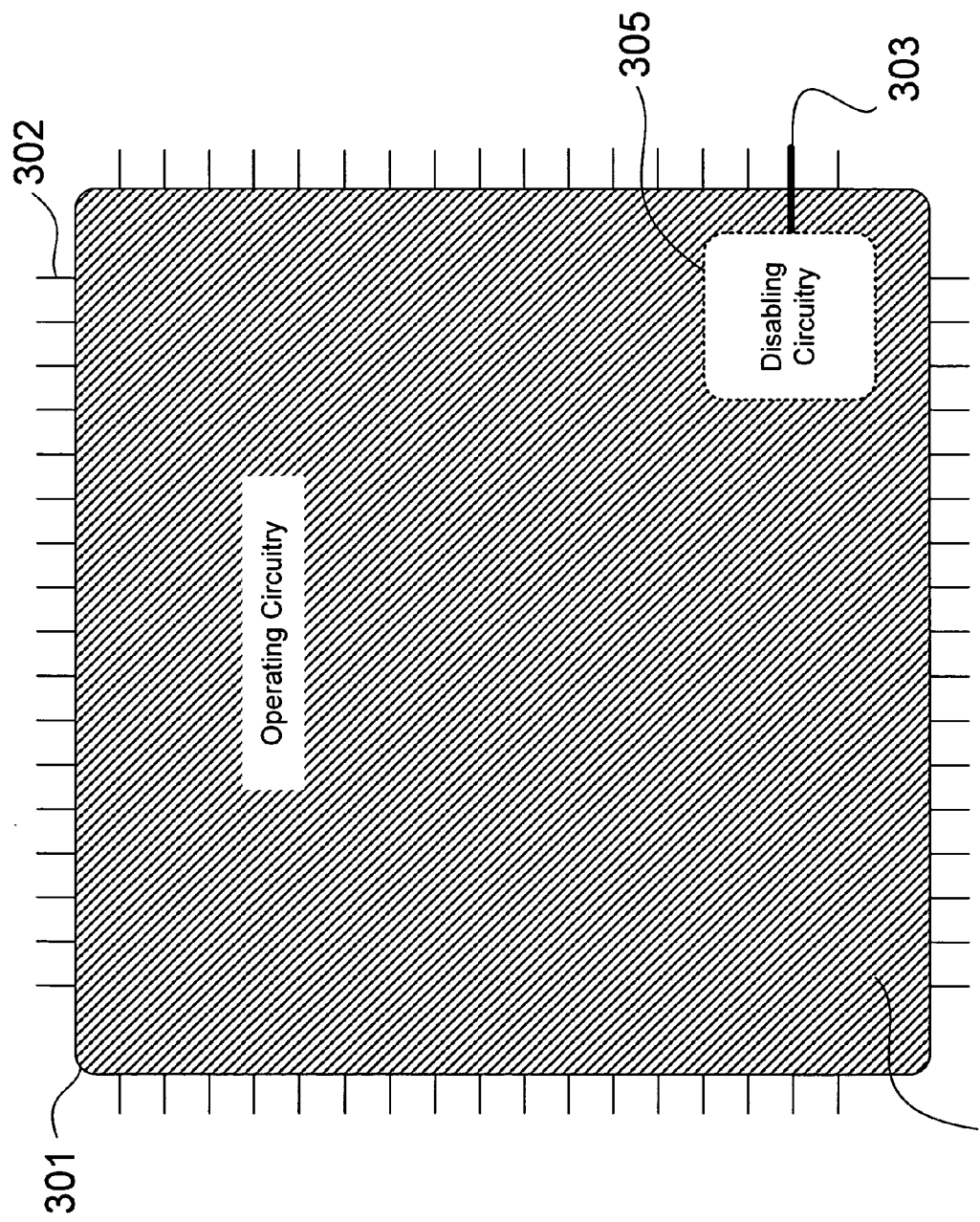
FIG. 3 is a functional block diagram of an illustrative integrated circuit in accordance with at least one aspect of the present invention.

FIG. 3 is a functional block diagram of an illustrative integrated circuit 301 that may be part of an electronic device such as electronic devices 100 and 201-206. The integrated circuit 301 shown has a quad flat pack (QFP) chip packaging. However, such a chip packaging is merely illustrative. The integrated circuit 301 may have any type of chip packaging, including but not limited to flip chip plastic grid array (FCPGA) packaging, ball grid array (BGA) packaging, pin grid array (PGA) packaging, or organic land grid array (OLGA) packaging.

The integrated circuit 301 as shown includes operational circuitry 304. The term "circuitry" as used herein is broadly used to include all types of circuitry, including circuitry made up of electrical and/or electro-optical components, analog, digital, and/or logical components, and/or fixed-function and/or programmable-function components, arranged together in such a way so as to perform one or more specified normal functions.

The operational circuitry 304 is the circuitry necessary for performing a subset or all of the normal functions of the integrated circuit 301. Moreover, normal operation of the operational circuitry 304 may be necessary for the normal operation of the electronic device that includes the integrated circuit 301. For example, where the integrated circuit 301 is a processor, the operational circuitry 304 would perform the processing function. And, if the processing function cannot be performed normally, then the electronic device requiring the processing function also could not operate normally. The integrated circuit 301 may perform other types of normal functions, such as but not limited to input/output control, bus control, and/or memory control. For example, the integrated circuit 301 may be the southbridge of an electronic device such as a computer. A southbridge is the chipset that manages the basic forms of input/output (I/O) such as Universal Serial Bus (USB), serial, audio, Integrated Drive Electronics (IDE), and Industry Standard Architecture (ISA) I/O in a computer. If the southbridge is disabled such that it cannot handle input and/or output, then the electronic device containing the southbridge may also be disabled such that it cannot be operated normally or at all.

The integrated circuit 301 further includes one or more electrically and/or optically conductive pins 302 or other input and/or output ports. These pins 302 are used to allow the integrated circuit 301 to communicate with entities external to the integrated circuit 301 and/or to provide power to the integrated circuit 301. The integrated circuit 301 may further include disabling circuitry 305, which may be electrically and/or optically coupled to one or more of the pins 302. In some embodiments, the disabling circuitry 305 may be electrically and/or optically coupled to, and interactive with, its own dedicated pin 303 (or its own dedicated plurality of pins). In such embodiments, the operating circuitry 304 would not be electrically or optically coupled to (and therefore not interactive with) the dedicated pin(s) 303. A potential advantage of such a configuration is that it may prevent other portions of the electronic device (such as any software executing on the electronic device) from being able to control or otherwise interfere with the disabling circuitry 305.

The disabling circuitry 305 is within the same integrated circuit 301 as the operational circuitry 304, and may even be disposed on or in the same substrate of the integrated circuit 301 as the operational circuitry 304. Although the operational circuitry 304 is illustratively shown to take up the remainder of the real estate of the integrated circuit 301 not used by the disabling circuitry 305, this is not necessarily the case. There may be additional circuitry on the integrated circuit 301 as well that is neither the operational circuitry 304 nor the disabling circuitry 305. In addition, although the operating circuitry 304 is shown to be separate from the disabling circuitry 305, they may share one or more circuitry components.

Figure 4:
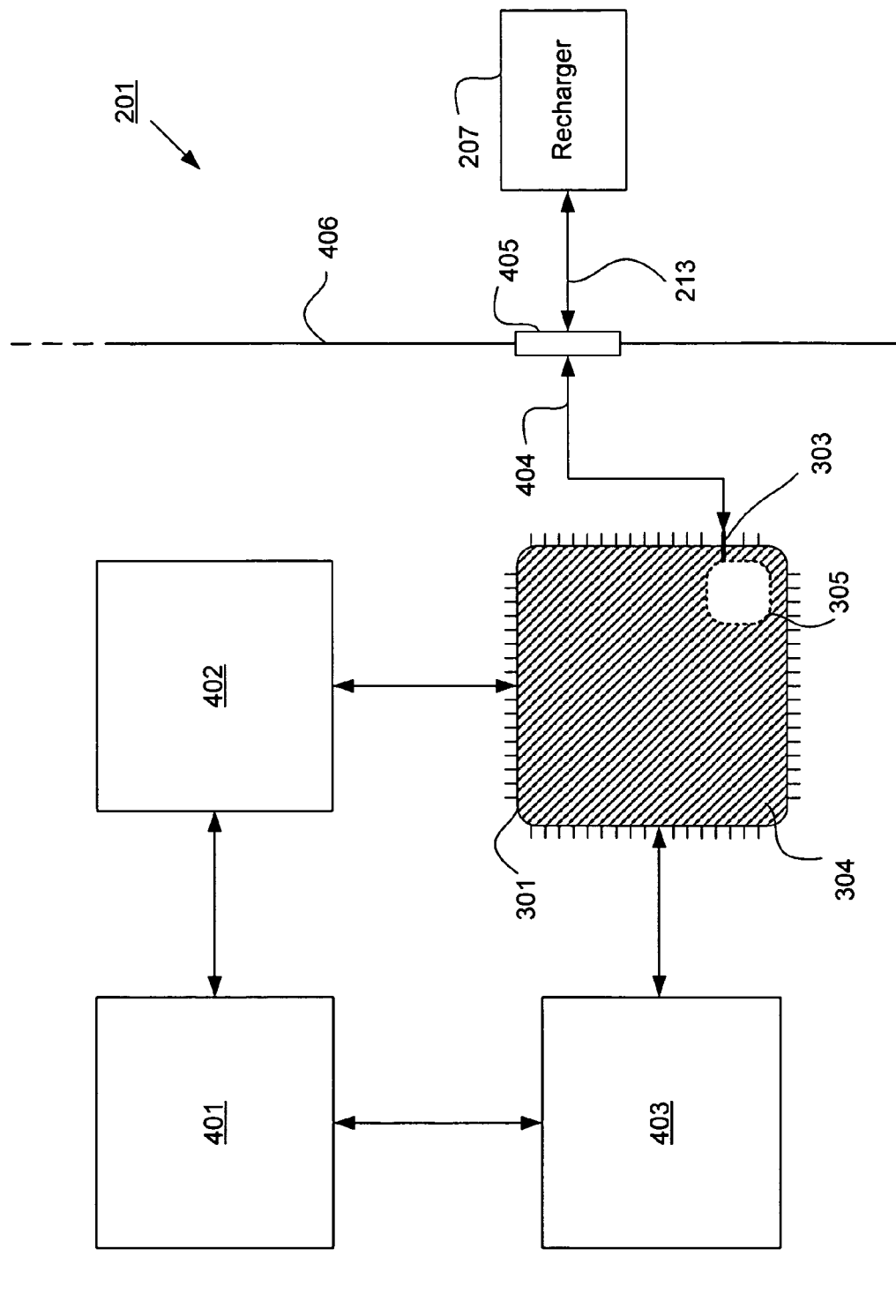
FIG. 4 is a functional block diagram of an illustrative electronic device including the integrated circuit of FIG. 3, coupled with an illustrative bonded recharger.

FIG. 4 illustratively shows the integrated circuit 301 as being part of an electronic device such as the mobile telephone 201. The mobile telephone 201 may further have other components, e.g., components 401, 402, 403, which may be other integrated circuits or any other components appropriate for the mobile telephone 201. The integrated circuit 301 may be any integrated circuit in the mobile telephone 201. The integrated circuit 301 may even be any integrated circuit necessary for normal operation of the mobile telephone 201. For example, the integrated circuit 301 may be the processor, input-output controller, bus controller, memory controller, and/or southbridge of the mobile telephone 201. If any one of these were disabled, the mobile telephone 201 would not operate normally. Thus, in such a case, disabling the integrated circuit 301 would cause the mobile telephone 201 as a whole to stop operating normally.

The mobile telephone 201 (or other electronic device) may further have a data communication path 404 through which the dedicated pin(s) 303 may communicate with a data communication port 405 that is accessible from outside a housing 406 of the mobile telephone 201. The data communication port 405 is configured to allow the mobile telephone 201 to be coupled (by wire and/or wirelessly) with the recharger 207 via the data communication path 213. The data communication path 404 and data communication port 405 may be physically and/or communicatively isolated from all other data communication paths, nodes, and ports in the mobile telephone 201. This may increases the security of any information transmitted between the integrated circuit 301 and the recharger 207. For instance, this may prevent any malicious software running on the mobile telephone 201 from listening in on communications between the integrated circuit 301 and the recharger 207, from taking control of the disabling circuitry 305, and/or from performing unauthorized communications with the recharger 207.

Illustrative Disabling Circuitry

Figure 5:
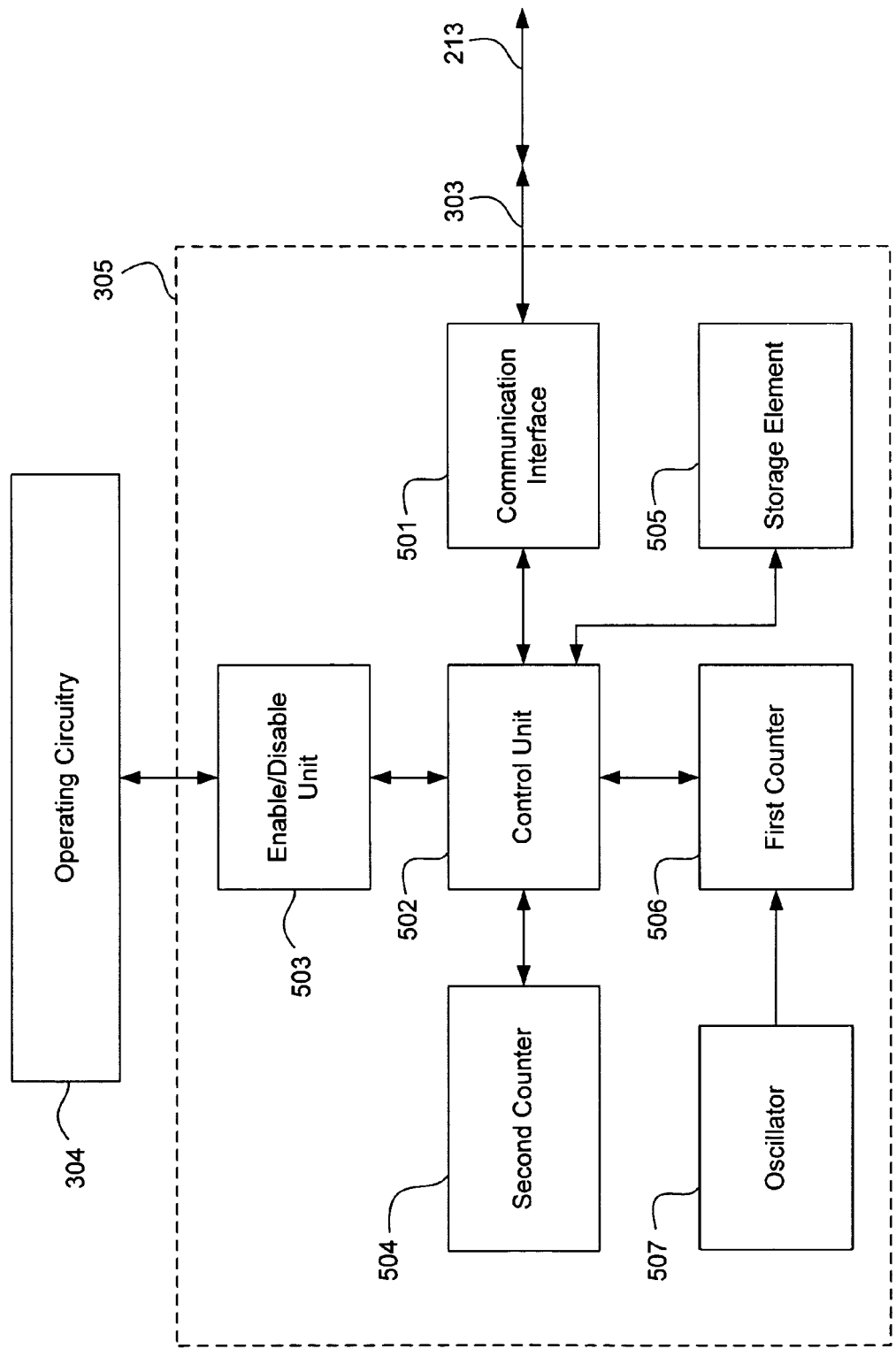
FIG. 5 is a functional block diagram of illustrative disabling circuitry that may be disposed within an integrated circuit, in accordance with at least one aspect of the present invention.

FIG. 5 is a functional block diagram of an illustrative embodiment of the disabling circuitry 305. The disabling circuitry 305 communicates with the recharger 207 via, in this example, pin 303. The pin 303 is communicatively (e.g., electrically or optically) coupled to a communication interface 501 in the disabling circuitry 305. The communication interface 501 initiates and/or maintains communications into and out of the disabling circuitry 305. The communication interface 501 is coupled to a control unit 502, which in turn is coupled to a first counter 506, a second counter 504, and a storage element 505. The first and second counters 506, 504 may be persistent counters. That is, they may maintain their states even when power is not supplied to the integrated circuit 301 and the disabling circuitry 305. The communication interface 501 may further support the receipt of electrical power to operate the electronic device (in this case, the mobile telephone 201). The control unit 502 may be any type of controller such as a simple arrangement of switches or a complex central processing unit. The control unit 502 monitors and controls the state of the first counter 506 and controls an enable/disable unit 503 in accordance with the state of the first counter 506. The first counter 506 is further controlled by the output of an oscillator 507 or some other periodic or semi-periodic signal source. The enable/disable unit 503 is coupled to the operational circuitry 304 and controls whether the operational circuitry 304 is enabled or disabled.

In addition to monitoring the first counter 506, the control unit 502 also monitors the state of the second counter 504 and controls access to the storage element 505 in accordance with the second counter. The storage element 505 stores a device identification "ID" and private code. The storage element 505 may be any element suitable for storing data, including but not limited to random access memory with battery backup, flash memory (or other forms of non-volatile storage), and/or read-only memory. During the "bonding" process discussed below, the control unit 502 may handle a request for the device ID and/or the private code. During the "recharging" process discussed below, the control unit 502 may handle an incoming device ID, compare the received device ID, and control the communication interface 501, the first counter 506, and the second counter 504 accordingly. Illustrative operation of the disabling circuitry 305 is discussed below.

The device ID and the private code each may be a set of data bits. Each set of bits may represent, e.g., a string of characters. For example, the device ID and/or the private code each may be a string of bits that represents, e.g., a random decimal number or alphanumeric string. The device ID and the private code each may be of any length and configuration. The longer they are, the more difficult they are to guess and the more secure the system will be. For example, it may be desirable to make the device ID and/or the private code each be a string of 160 bits or more. However, the device ID and the private code may be of any greater or lesser length. The device ID and/or the private code may be preset at the time the chip is manufactured, as part of the chip testing process. If the device ID and private code are large random numbers unique to each chip, there is no need for the chip manufacturer to record or keep track of them.

The first counter 506 may keep track of what is effectively a remaining account balance that determines whether and when the mobile telephone 201 should operate normally or abnormally. The first counter 506 may be preset with a first value and may automatically count up or down to a second value in accordance with pulses from the oscillator 507. For example, each pulse (or each nth pulse) of the oscillator may cause the first counter 506 to count up or down by one or more count units. While the first counter 506 has not yet reached the second value, the mobile telephone 201 operates normally. In other words, the disabling circuitry 305 does not interfere with the normal operation of the mobile telephone 201. However, once the first counter 506 has reached the second value, the control unit 502 senses this and in response commands the enable/disable unit 503 to interfere with the normal operation of the operating circuitry 304 on the integrated circuit 301 (and thus the normal operation of the mobile telephone 201). If the mobile telephone 201 is then recharged (as will be discussed further below), then the control unit 502 also senses this and in response commands the enable/disable unit 503 to stop interfering with the normal operation of the operating circuitry 304 (and thus the normal operation of the mobile telephone 201).

The enable/disable unit 503 may be designed as needed to appropriately interfere with the normal operation of the operating circuitry 304 of the integrated circuit 301. The particular design of the enable/disable unit 503 thus may depend upon the design of the operating circuitry 304. For example, if the operating circuitry 304 has an overall enable node, then the enable/disable unit 503 may control the state of the enable node of the operating circuitry 304.

Although the various functional blocks in FIG. 5 are shown as separate, this is for illustrative purposes only. Functions may be combined or further subdivided.

Illustrative Recharger

Figure 6:
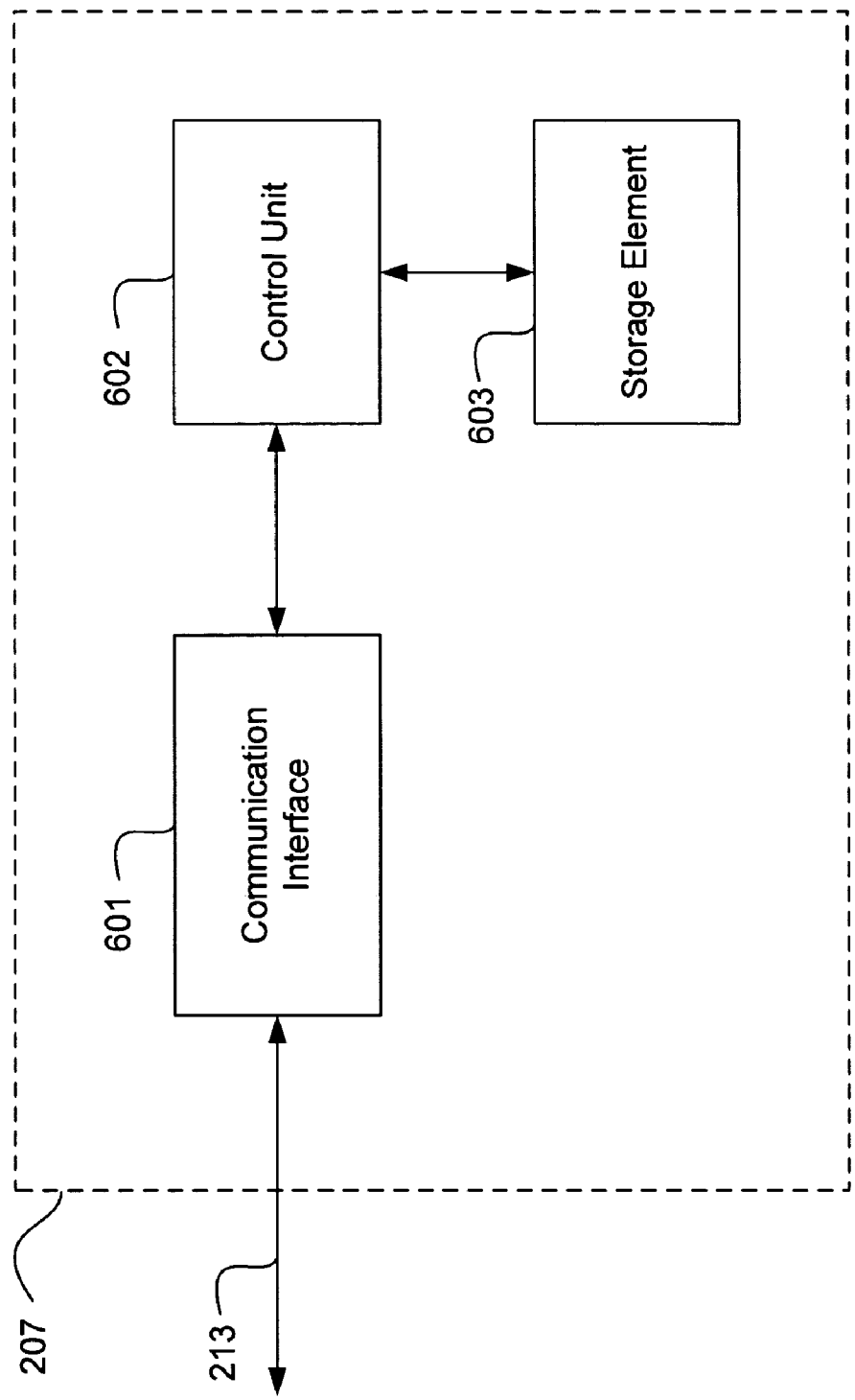
FIG. 6 is a functional block diagram of an illustrative recharger, in accordance with at least one aspect of the present invention.

FIG. 6 is a functional block diagram of an illustrative embodiment of the recharger 207. The recharger 207 includes a communication interface 601 that initiates and/or maintains communications into and out of the recharger 207 via the data communication path 213. The communication interface 601 may further support the receipt of electrical power to operate the recharger 207, and/or the transmission of electrical power to operate the electronic device (in this case, the mobile telephone 201). A control unit 602 is coupled to the communication interface 601 and to a storage element 603. The control unit 602 may be any type of controller such as a simple arrangement of switches or a complex central processing unit. The storage element 603 may be any element suitable for storing data including, but not limited to, random access memory with battery backup, flash memory (or other forms of non-volatile storage), and/or read-only memory.

During the bonding process discussed below, the control unit 602 may cause a request to be sent out to the electronic device via the communication interface 601. In response to the request, the control unit 602 may receive, via the communication interface 601, the device ID and/or private code from the electronic device. The control unit 602 may then cause the device ID and/or private code to be stored in the storage element 603. During the recharging process discussed below, the control unit 602 may cause the device ID and/or private code stored in the storage element 603 to be sent via the communication interface 601 to the electronic device.

Although the various functional blocks in FIG. 6 are shown as separate, this is for illustrative purposes only. Functions may be combined or further subdivided.

Bonding a Recharger with an Electronic Device

Figure 7:
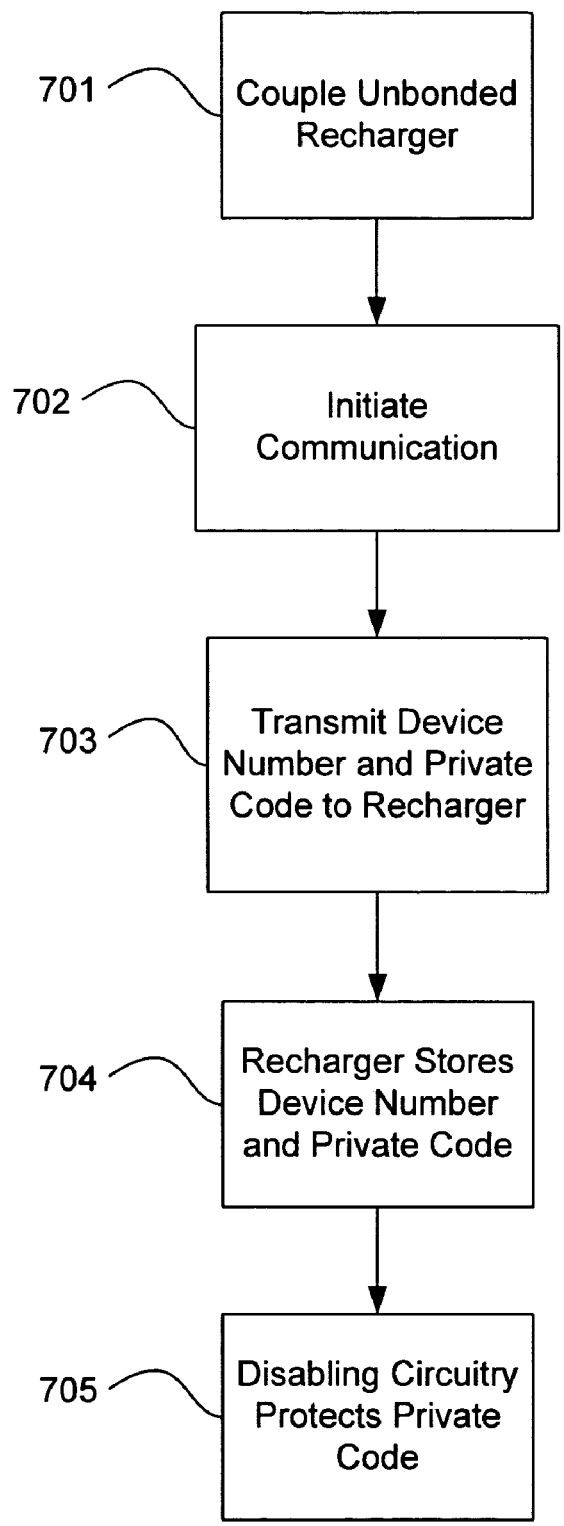
FIG. 7 is an illustrative flowchart of steps that may be taken when "bonding" a recharger with an electronic device, in accordance with at least one aspect of the present invention.

FIG. 7 show illustrative steps that may be taken to bond a recharger (such as the recharger 207) with an electronic device (such as the mobile telephone 201). In step 701, the recharger 207 is communicatively coupled to the mobile telephone 201 via the data communication path 213. The recharger 207 is considered unbonded at this point since it has not been previously bonded with any other electronic device. This means that the storage element 603 does not currently store the device ID and private code of any electronic device. After coupling the recharger 207 in step 701, the circuitry of the recharger 207 and the disabling circuitry 305 initiate communication in step 702. The recharger 207 and the disabling circuitry 305 sense that the other is present and begin the bonding process. Each device may sense the presence of the other in any of a number of ways. For example, when the recharger 207 and mobile telephone 201 are not coupled, their respective communication interfaces 601, 501 may be in an open circuit mode. But, when the recharger 207 and the mobile telephone 201 are coupled together, their respective communication interfaces 601, 501 may together form a closed circuit.

Returning to the flowchart, in step 703, the disabling circuitry 305 transmits the device ID and private code stored in the storage element 505 to the recharger 207 via the data communication path 213. Next, in step 704, the recharger 207 stores the received device ID and private code in the storage element 603. As will be seen below with regard to the recharging process, the use of both a device ID and a private code is provides for more security than using only one of these. After the device number and private code are stored in the storage element 603 of the recharger 207, the recharger 207 is considered to be bonded to the mobile telephone 201.

Once the recharger 207 is bonded to mobile telephone 201, in step 705 the disabling circuitry 305 may ensure that the private code will no longer be sent outbound over the data communication path 213. For example, the disabling circuitry 305 may set a persistent switch to prevent the private code from being sent outbound from the disabling circuitry 305. In the embodiment shown in FIG. 5, the second counter 504 may be used to limit the total number of times that the private code may be sent outbound from the disabling circuitry 305. In such a configuration, the second counter 504 may be initially set to a first value (e.g., 10,000), and each time the private code and/or the device ID is transmitted by the disabling circuitry 305, the second counter 504 counts down (or up) or is otherwise altered. Once the second counter 504 reaches a second value (e.g., zero), then the control unit 502 senses this and as a result prevents the communication interface 501 from further transmitting the private code. In such an embodiment, step 704 may include transmitting the private code and/or the device ID a plurality of times (in this example, 10,000 times) over the data communication path 213 until; the second counter 504 reaches the second value. By setting the initial value of the second counter 504 sufficiently high, the integrated circuit manufacturer may be able to adequately test the full functionality of the integrated circuit 301, including the functionality of the disabling circuitry 502. Later, when the tested integrated circuit 301 is provided in the electronic device to the ultimate user, the state of the second counter 504 may have already counted to a value other than its initial value. However at that point the second counter 504 still would not have reached its final value, thus allowing the user to properly bond the electronic device with a recharger.

Recharging an Electronic Device with a Bonded Recharger

As previously mentioned, the illustrative embodiment discussed herein uses both a device ID and a private code. Responsive to the disabling circuitry 305 receiving the private code, the disabling circuitry 305 extends the amount of time that the operating circuitry 304 will operate normally or re-enables the operating circuitry 304. Normally, the private code is given to the disabling circuitry 305 by the recharger. However, it may not be desirable for the recharger to so easily reveal the private code. For instance, if the recharger were borrowed temporarily, it may not be desirable for an unauthorized person to obtain the private code from the recharger. Armed with knowledge of the private code, the unauthorized person may later be able to easily recharge the electronic device without the recharger, simply by feeding the private code into the electronic device.

A protocol that uses both the private code and the device ID may make it more difficult for an unauthorized person to steal the private code. In essence, the device ID may be used as a preliminary check by the electronic device that the recharger is an authorized recharger, and/or by the recharger that the electronic device is the correct electronic device. An example of such a recharge protocol is now discussed with regard to FIG. 8.

Figure 8:
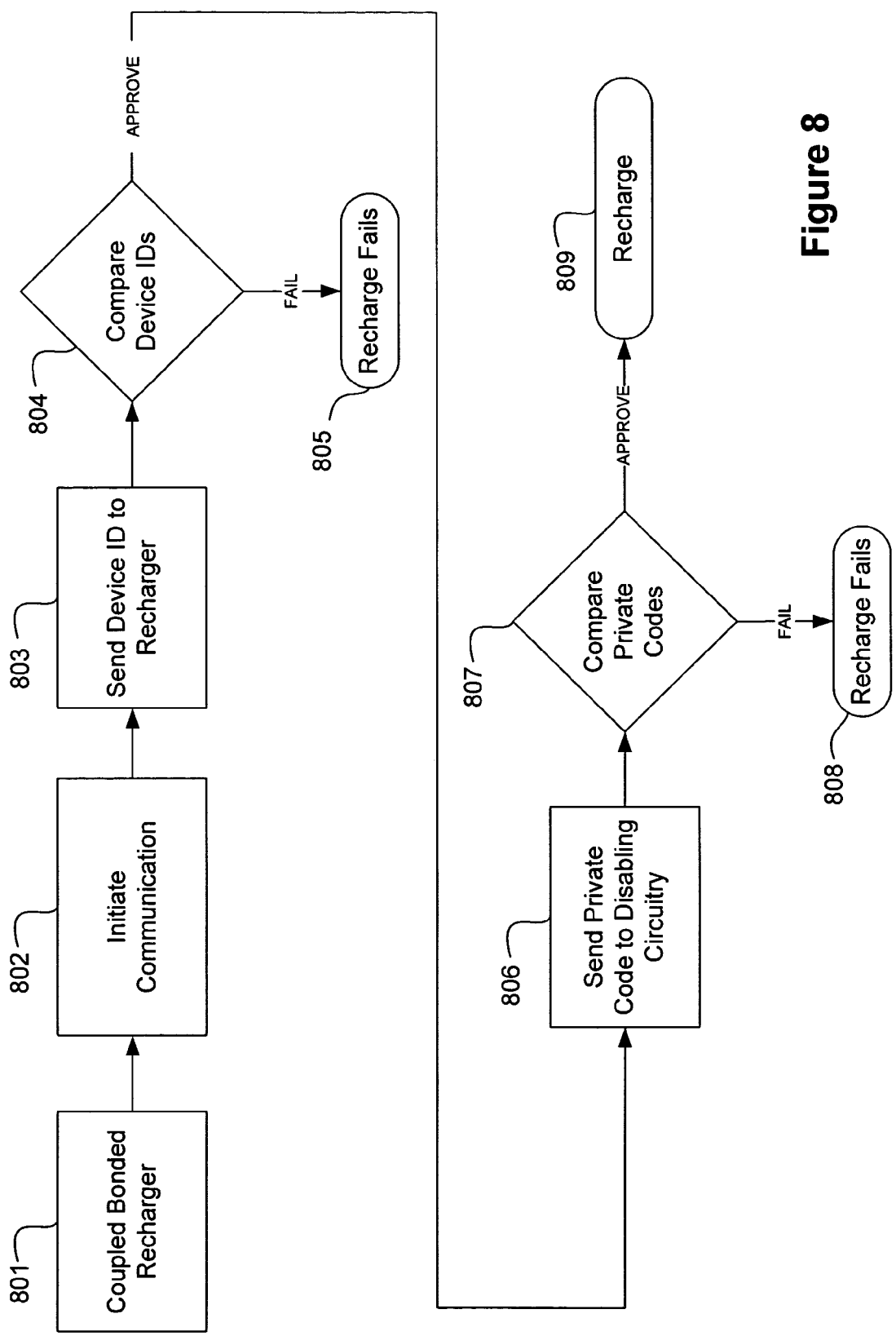
FIG. 8 is an illustrative flowchart of steps that may be taken when "recharging" an electronic device, in accordance with at least one aspect of the present invention.

In step 801 of FIG. 8, the recharger 207 that was previously bonded in accordance with the steps shown in FIG. 7 is communicatively coupled to the mobile telephone 201 via the data communication path 213. In step 802, the recharger 207 and the disabling circuitry 305 initiate communication, and the recharger 207 and disabling circuitry 305 each senses the presence of the other device. In step 803, the disabling circuitry 305 transmits the device ID stored in the storage element 505 to the recharger 207.

In step 804, the recharger 207 compares the device ID sent by the disabling circuitry 305 with the device ID previously stored in the storage element 603 during the previously-described bonding process. In making the comparison, the control unit 602 of the recharger 207 may, e.g., evaluate whether the received device ID (or a portion thereof) and the device ID (or a portion thereof) stored in the storage element 603 are an exact match. Alternatively, the control unit 602 may perform the comparison by evaluating whether the received device ID (or a portion thereof) has a particular relationship to the device ID (or a portion thereof) stored in the storage element 603. For example, the control unit 602 may evaluate whether the received device ID is within a certain numerical range of the device ID stored in the storage element 603. Or, the control unit 602 may perform the comparison by evaluating whether certain data associated with the device ID (or a portion thereof) matches the device ID (or a portion thereof) stored in the storage element 603. For example, the device ID as transmitted to the recharger 207 may be encoded, and the data referred to previously that is associated with the device ID may be the decoded version of the encoded device ID.

If the control unit 602 in the recharger 207 approves the comparison of the received device ID and the device ID in the storage element 603 (e.g., if the device IDs match), then the recharger 207 proceeds to step 806, which causes the private code to be transmitted by the recharger 207. However, if the control unit 602 does not approve of the comparison of the device IDs, the recharging process is ended in step 805 without recharging the mobile telephone 201. Thus, the private code is sent by the recharger 207 only if the correct device ID is first provided to the recharger 207. As previously mentioned, this provides at least some added security against an unauthorized user tricking the recharger 207 into revealing the private code.

Thus, referring to step 806, the control unit 602 in the recharger 207 transmits the private code stored in the storage element 603 to the disabling circuitry 305 via the data communication path 213. The communication interface 501 of the mobile telephone 201 receives the transmitted private code and forwards it to the control unit 502 for evaluation. Accordingly, in step 807, the control unit 502 compares the received private code and the private code stored in the storage element 505. Again, such a comparison may be performed in any of a number of ways. For example, the control unit 502 of the mobile telephone 201 may, e.g., evaluate whether the received private code (or a portion thereof) and the private code (or a portion thereof) stored in the storage element 505 are an exact match. Alternatively, the control unit 502 may perform the comparison by evaluating whether the received private code (or a portion thereof) has a particular relationship to the private code (or a portion thereof) stored in the storage element 505. For example, the control unit 502 may evaluate whether the received private code is within a certain numerical range of the private code stored in the storage element 505. Or, the control unit 502 may perform the comparison by evaluating whether certain data associated with the private code (or a portion thereof) matches the private code (or a portion thereof) stored in the storage element 505. For example, the private code as transmitted to the mobile telephone 201 may be encoded, and the data referred to previously that is associated with the private code may be the decoded version of the encoded private code.

If the control unit 502 approves of the comparison (e.g., if the private codes match), the disabling circuitry 305 proceeds to step 809 to recharge the mobile telephone 201. However, if the disabling circuitry 305 does not approve of the comparison between the private code of the recharger and the private code of the disabling circuitry (e.g., the private codes do not match), then the recharging process may terminate at step 808 without recharging the mobile telephone 201.

In step 809, the control unit 502 may reset the first counter 506 to the initial first value or to another value. The value to which the first counter 506 is set may be stored in the storage element 505, or the value may be transmitted by the recharger 207 over the data communication path 213 and ultimately received by the control unit 502. The recharger 207 may send the value to set the first counter 506 to at any time during the recharge process, such as during step 803 or step 806. The value may also be set by the user of the recharger 207 using a user interface at the recharger 207 (not shown) or at the electronic device (e.g., using the keyboard 162 if one exists).

Conclusion

Thus, a way of securing electronic devices from extensive unauthorized use has been described. While illustrative embodiments as described herein in accordance with various aspects of the present invention are shown by way of example, it will be understood that the invention is not limited to these embodiments. Modifications may be made by those skilled in the art, particularly in light of the foregoing teachings. For example, each of the elements of the aforementioned embodiments may be utilized alone or in combination with elements of the other embodiments. In addition, the invention has been defined using the appended claims; however, these claims are illustrative in that the invention is intended to include the elements and steps described herein in any combination or sub combination. Also, encryption techniques may additionally or alternatively be used for communication between the electronic device and the recharger. It will also be appreciated and understood that modifications may be made without departing from the true spirit and scope of the invention.

What is claimed is:

1. A system comprising:
    an apparatus having an integrated circuit that includes disabling circuitry, the disabling circuitry having a first counter, wherein the disabling circuitry is configured to selectively disable normal operation of the apparatus responsive to a first count state defined by the first counter reaching a first defined value, and wherein the apparatus is associated with a unique identifier; and
    a portable device configured to establish a communication link with the apparatus in order to:
        receive a unique identifier from the apparatus and evaluate the received unique identifier to determine whether the apparatus is operationally bonded to the portable device, and
        in response to determining that the apparatus and portable device are operationally bonded, transmit data including a private code to the apparatus, the transmitted private code being evaluated by the apparatus to determine whether the apparatus and portable device are operationally bonded, wherein a determination by the apparatus that the apparatus and portable device are operationally bonded causes the disabling circuitry to either enable the normal operation of the apparatus alter the normal operation has been previously disabled responsive to the first count state, or
        set the first counter to a value further delaying the first counter from reaching the first defined value,
    wherein the portable device is operationally bonded to the apparatus associated with the unique identifier as a result of a bonding process preformed between the portable device and the apparatus,
    wherein before the bonding process is performed, the portable device is capable of being operationally bonded to any of a plurality of apparatuses associated with different identifiers,
    wherein after the bonding process is performed, the portable device is prevented from being operationally bonded to any of the plurality of apparatuses other than the apparatus associated with the unique identifier,
    wherein the bonding process comprises:
        automatically transmitting the unique identifier and the private code from the apparatus to the portable device upon an initial establishment of the communication link between the apparatus and portable device, and
        disabling the apparatus from performing any further transmission of the private code, and
    wherein, before the first count state occurs, the apparatus is capable of the normal operation without having the communication link established.

2. The system of claim 1, wherein the integrated circuit further includes an oscillator coupled to the first counter, wherein the first counter is configured to change the first count state responsive to the oscillator.

3. The system of claim 1, wherein the first counter maintains the first count state when power is removed from the integrated circuit.

4. The system of claim 1, wherein the integrated circuit further includes an external data connection configured to receive the data transmitted by the portable device, and the disabling circuitry is configured to compare the private code of the received data with internal data stored in the integrated circuit and to set the first count state of the first counter based on the comparison.

5. The system of claim 4, wherein the disabling circuitry is configured to set the first count state to a value that is defined by the received data.

6. The system of claim 1, wherein the integrated circuit further includes an external data connection to receive the data transmitted from the portable device, and the disabling circuitry is further configured to compare the private code of the received data with internal data stored in the integrated circuit and to enable the integrated circuit based on the comparison.

7. The system of claim 1,
wherein the integrated circuit further includes an external data connection to send to and receive data from the portable device, and the disabling circuitry is configured to send first internal data stored in the integrated circuit to the external data connection, receive external data from the external data connection, compare the external data with second internal data stored in the integrated circuit, and enable the integrated circuit based on the comparison, and
wherein the first internal data is the unique identifier, and the second identifier is the private code.

8. The system of claim 1, wherein the disabling circuitry further includes a second counter defining a second count value and a storage element, and wherein the integrated circuit further includes an external data connection to send to and receive data from the portable device, wherein the disabling circuitry is configured to send a content of the storage element to the external data connection only a predetermined number of times based on the second count value.

9. The system of claim 1, wherein the integrated circuit has a chip data connection, the apparatus further including a housing, a data communication port accessible to the portable device from outside the housing, and a dedicated data transmission path coupling the chip data connection with the data communication port.

10. In an integrated circuit having a counter and disabling circuitry, the integrated circuit being implemented within an apparatus associated with a unique identifier, a method comprising steps of:
utilizing a counter to count to a defined value;
responsive to the defined value being reached, utilizing the disabling circuitry to disable normal operation of the apparatus;
establishing a communication link with a portable device operationally bonded to the integrated circuit;
conducting data communications with the portable device via the communication link in order to:
transmit data including a unique identifier to the portable device, the unique identifier being evaluated by the portable device to determine whether the integrated circuit and portable device are operationally bonded, the portable device transmitting data including a private code to the apparatus in response to determining that the apparatus and portable device are operationally bonded; and
receive the data including the private code transmitted by the portable device and evaluate the private code to determine whether the integrated circuit and portable device are operationally bonded; and
responsive to determining that the integrated circuit and portable device are operationally bonded, performing at least one of:
utilizing the disabling circuitry to enable the normal operation of the apparatus after the normal operation has been previously disabled by the disabling circuitry, and
utilizing the disabling circuit to set the counter to a value further delaying the count from reaching the defined value,
wherein the portable device is operationally bonded to the apparatus associated with the unique identifier as a result of a bonding process performed between the portable device and the apparatus,
wherein before the bonding process is performed the portable device is capable of being operationally bonded to an integrated circuit in any of a plurality of apparatuses associated with different identifiers,
wherein after the bonding process is performed, the portable device is prevented from being operationally bonded to any of the plurality of apparatuses other than the apparatus associated with the unique identifier,
wherein the bonding process comprises:
automatically transmitting the unique identifier and the private code from the apparatus to the portable device upon an initial establishment of the communication link between the apparatus and portable device, and
disabling the apparatus from performing any further transmission of the private code, and
wherein, before the first count state occurs, the apparatus is capable of the normal operation without having the communication link established.

11. The method of claim 10, further comprising steps of:
sending first internal data stored in the integrated circuit out through an external data connection of the integrated circuit to the portable device;
receiving external data from the portable device into the external data connection; and
comparing the external data with second internal data stored in the integrated circuit,
wherein the first internal data is the unique identifier, and the second identifier is the private code.

12. The method of claim 11, further comprising a step of setting the counter to a second defined value responsive to the comparison.

13. The method of claim 12, wherein the step of setting the counter is performed responsive to the external data and the internal data being identical.

14. The method of claim 12, wherein the step of setting the counter includes receiving the second defined value from the portable device.

15. The method of claim 12, wherein the second defined value is received from a storage element of the integrated circuit.

16. The method of claim 10, wherein the step of counting is performed responsive to an output of an oscillator of the integrated circuit.

17. The system of claim 1, wherein the portable device, in addition to performing data communications with the apparatus, the portable device is configured to recharge power in the apparatus.

18. A system comprising:
a mobile phone storing a unique identifier, the mobile phone having an integrated circuit that includes disabling circuitry, the disabling circuitry having a first counter, wherein the disabling circuitry is configured to selectively disable normal operation of the mobile phone responsive to a first count state defined by the first counter reaching a first defined value; and
a mobile phone recharger configured to establish a communication link with the mobile phone in order to:
receive a unique identifier from the mobile phone and determine whether the mobile phone and mobile phone recharger are operationally bonded based on the received unique identifier,
in response to determining that the mobile phone and mobile phone recharger are operationally bonded, transmit data including a private code to the mobile phone, the transmitted private code being evaluated by the mobile phone to determine whether the mobile phone and mobile phone recharger are operationally bonded, wherein a determination by the mobile phone that the mobile phone and mobile phone recharger are operationally bonded causes the disabling circuitry to either enable the normal operation of the mobile phone after the normal operation has been previously disabled responsive to the first count state, or set the first counter to a value further delaying the first count state from reaching the first defined value, wherein the mobile phone recharger is operationally bonded to the mobile phone as a result of a bonding process performed between the mobile phone and the mobile phone recharger wherein before the bonding process is performed, the mobile phone recharger is capable of being operationally bonded to any of a plurality of mobile phones storing different identifiers, wherein after the bonding process is performed, the mobile phone recharger is prevented from being operationally bonded to any of the plurality of mobile phones other than the mobile phone storing the unique identifier, and wherein the bonding process comprises:

automatically transmitting the unique identifier and the private code from the mobile phone to the mobile phone recharger upon an initial establishment of the communication link between the mobile phone and mobile phone recharger, and disabling the mobile phone from performing any further transmission of the private code.

\* \* \* \* \*